UNITED STATES PATENT OFFICE.

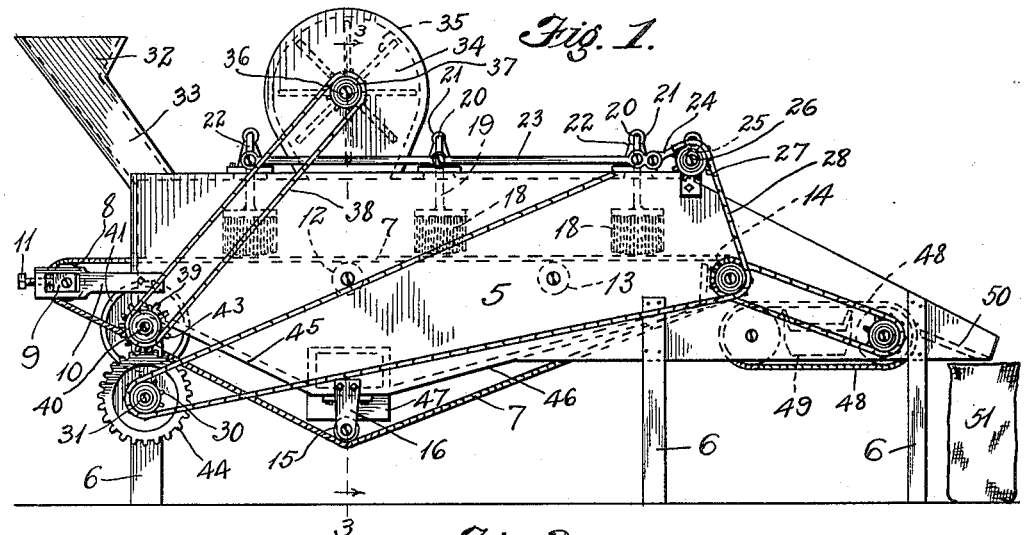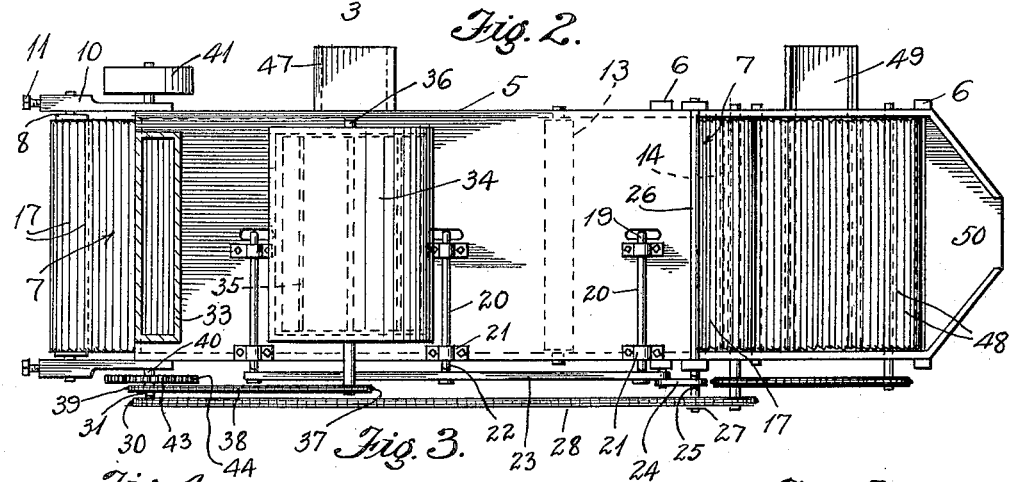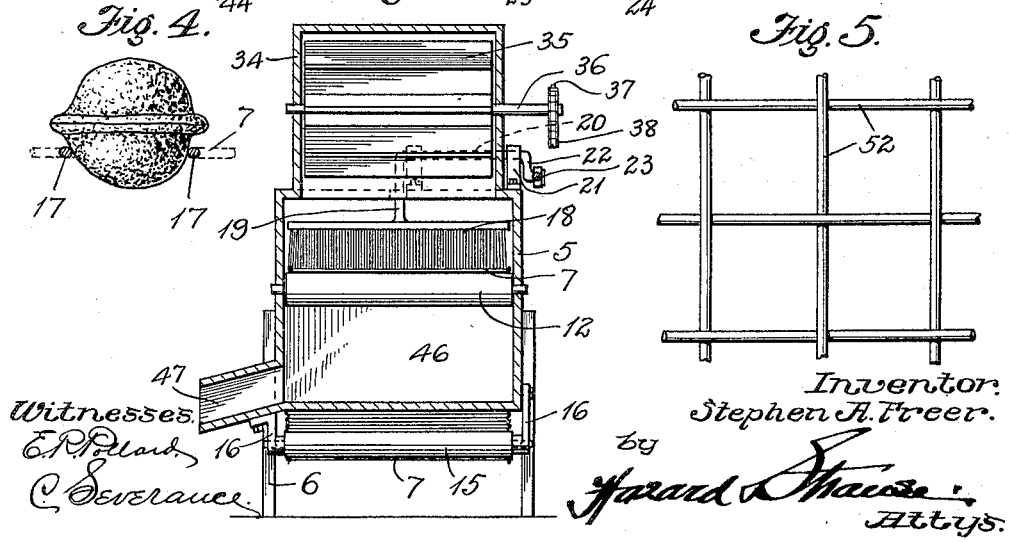

STEPHEN A. FREER, OF EL MONTE, CALIFORNIA.

NUT-CLEANING MACHINE.

1,074,940.  Specification of Letters Patent.  Patented Oct. 7, 1913.

Application filed January 23, 1912. Serial No. 672,913.

*To all whom it may concern:*

Be it known that I, STEPHEN A. FREER, a citizen of the United States, residing at El Monte, in the county of Los Angeles and State of California, have invented new and useful Improvements in Nut-Cleaning Machines, of which the following is a specification.

This invention relates to improvements in nut cleaning machines, and particularly to such machines as are adapted to clean nuts in dry condition.

It is also an object of the invention to provide a traveling conveying means for carrying nuts to be cleansed and brushed for operating upon said nuts and cleaning them upon all sides.

It is a further object of the invention to provide a nut cleaning mechanism in which the nuts are carried beneath swinging brushes, after which they are discharged upon a separating device.

In the accompanying drawing forming a part of this specification, Figure 1 is a side elevation of the mechanism constructed in accordance with the present invention. Fig. 2 is a top plan view of the same. Fig. 3 is a vertical transverse sectional view taken upon the line 3—3 of Fig. 1. Fig. 4 is a detail sectional view through adjacent strands of a nut supporting webbing, a nut being shown in position thereon. Fig. 5 is a top plan view of a modified form of supporting webbing for the nuts.

The details and features of the invention will now be more particularly described, reference being had to the said drawing in which—

5 indicates an elongated approximately rectangular housing, usually mounted upon standards or legs 6. Mounted within the housing 5 is a traveling conveyer 7 which at one end of the device passes out of the housing and around a supporting roller 8 which is journaled in bearing blocks 9 adjustably supported upon arms 10, which arms project from the housing 5. Adjusting screws 11 are employed for holding the blocks 9, so as to maintain a proper tautness in the conveyer 7. The said traveling conveyer passes over intermediate supporting and nut turning rollers 12 and 13 arranged within the housing 5 and also about a driving roller 14 near the discharge end of the mechanism. From the roller 14 the conveyer passes downwardly and out through the bottom of the housing 5 and around a lower guide roller 15 which is journaled upon projections 16 carried by the housing 5. From the roller 15 the conveyer passes to the roller 8 again.

The driving roller 14 is actuated in any suitable manner and usually as in the manner hereinafter described for moving the conveyer 7. The said conveyer 7 is generally formed of a series of parallel rods or supporting wires 17 as shown in Figs. 2 and 4 of the drawing, the ends of said wires being bent and linked together to form a flexible apron or conveyer. The spaces between the wires are of such size as to partially receive the nuts to be cleaned but not so as to permit the nuts to drop through the conveyer. The nuts usually assume a position approximately like that shown in Fig. 4.

In order to thoroughly brush and clean the nuts and also to turn them over upon the conveyer, so that all sides thereof will be cleaned, the rolls 12 and 13 are provided to turn the nuts intermediate of a series of movable brushes 18 extending transversely of the housing 5 and close enough to the upper surface of the traveling conveyer to engage nuts resting upon the same. The said brushes are mounted so as to swing or oscillate longitudinally with respect to the conveyer and are made nearly the full width of the housing 5, so as to reach every part of the said conveyer. The brushes are also made of considerable width as indicated in dotted lines in Fig. 1, so as to be capable of thoroughly brushing the nuts as they are moved back and forth.

In order to rock or oscillate the brushes the said brushes are carried upon arms 19, which project downwardly from rock shafts 20 mounted upon the top of the housing 5. The said shafts 20 are journaled upon standards 21 upon the top of the housing 5. The shafts extend to one side of the housing and are provided with crank arms 22 which are pivotally connected by a connecting rod 23. As shown in the drawing the device is preferably provided with a plurality of brushes and a connecting rod 23 causes them to move simultaneously. One end of the said connecting rod 23 is also pivotally connected with a pitman 24, which extends to and engages a crank 25 carried by a transversely arranged shaft 26. The rotation of the said shaft 26, will thus through the agency of the said pitman 24, cause a reciprocation of the connecting rod 23 and a proper swinging or oscillation of the brushes 18.

The shaft 26 is provided at one end with a sprocket wheel 27 by which the shaft 26 may be rotated. The said sprocket wheel 27 is driven by a sprocket chain 28, which passes about a sprocket wheel 27 secured to the driving roller 14 of the conveyer, the said sprocket chain thus passing to a driving sprocket 30 carried by a shaft 31, which is journaled upon the standards 6, of the housing at one end thereof. The movement of said sprocket chain, thus produces a feeding of the conveyer belt through the housing 5 and a swinging of the brushes back and forth, over the upper surface of said conveyer.

The housing 5 is provided at one end with a feed hopper 32 having a chute 33, extending downwardly into the housing 5, so that the nuts to be cleaned are merely emptied into the said hopper and will be distributed by the chute 33 upon the conveyer 7. Means is also provided for fanning the dirt and dust from the nuts, said means preferably acting upon the nuts while they are being brushed upon the conveyer. Extending upwardly from the housing 5 is a casing 34, in which is mounted a revoluble fan 35 having a series of fan arms or paddles. A shaft 36 carrying the said paddles is journaled at its ends in the said casing 34. One end of the said shaft projects beyond the casing 34 and has secured to it a sprocket wheel 37. A sprocket chain 38 connects the said sprocket wheel 37, with another sprocket wheel 39, which is secured to a shaft 40 journaled above the shaft 31 and parallel thereto, upon the same standards 6. The shaft 40 extends to the other side of the mechanism and is provided with a belt wheel or pulley 41, which may be connected with any suitable source of power for driving the same. The shaft 40 is also provided with a gear wheel 43, adjacent to the sprocket wheel 39, which meshes with a gear 44 carried by the shaft 31. The driving of the shaft 40 thus actuates through the said gears, the shaft 31 and the two sprocket chains 38 and 28 are also driven simultaneously.

The materials brushed from the nuts drop through the webbing of the conveyer 7 and are collected upon inclined bottom floors 45 and 46 which converge toward each other, so as to deliver the dirt and other materials to a discharge chute 47, which projects laterally from the housing 5 as clearly shown in Fig. 3. The nuts themselves are carried toward the discharge end of the housing where they fall upon an apron 48, of somewhat wider mesh than the conveyer 7. This allows the smaller nuts to fall through and into a transverse trough 49, which extends outwardly through one side of the housing 5. The larger nuts which will not fall through the mesh of the apron 48, are carried to a discharge spout 50 at the end of the housing. Bags or other receptacles 51 are usually located beneath this spout to receive the said nuts.

The conveyer may be formed of a webbing having interwoven strands of wire or other material as shown at 52 in Fig. 5 of the drawing if desired, though usually the parallel transversely extending strands or rods shown in Figs. 2 and 4 are preferable. Of course it will be understood that the nuts cleaned or treated in this mechanism are first shelled, the hulls being removed in any other desired mechanism, or in any other manner before they are placed in the hopper 32.

What I claim is:

A nut cleaning device, comprising a housing, an endless conveyer supported therein, said conveyer formed of a flexible metallic structure provided with transverse bars adapted to embrace and support a nut in operative position thereon, a hopper for delivering nuts to said conveyer, a plurality of pivotally mounted brushes adapted to oscillate in the path of said conveyer and frictionally engage said nuts, a plurality of rolls mounted in the path of and supporting said conveyer intermediate of said brushes whereby the nuts are lifted from engagement with the conveyer and turned to be engaged on their opposite surfaces by the next succeeding brush, a fan connected to said housing, a discharge belt to receive the nuts as they are cleaned, a hopper to receive the material brushed from the nuts, and means to drive said conveyer and fan, and reciprocate said brushes simultaneously.

In witness that I claim the foregoing I have hereunto subscribed my name this 13th day of January, 1912.

STEPHEN A. FREER.

Witnesses:
E. STADTMAN,
EARLE R. POLLARD.

---

Copies of this patent may be obtained for five cents each, by addressing the "Commissioner of Patents, Washington, D. C."